United States Patent [19]

Page

[11] 4,207,663

[45] Jun. 17, 1980

[54] TOOL FOR REMOVING A CYLINDER LOCK

[76] Inventor: Benjamin L. Page, 107 Trinity St., Abbeville, S.C. 29620

[21] Appl. No.: 901,298

[22] Filed: May 1, 1978

[51] Int. Cl.[2] .............................................. B23P 19/04

[52] U.S. Cl. ...................................................... 29/263

[58] Field of Search ................. 29/259, 261, 263, 264, 29/265; 279/43, 50, 57

[56] References Cited

U.S. PATENT DOCUMENTS

| | | | |
|---|---|---|---|
| 3,972,103 | 8/1976 | Kenyon | 29/263 |
| 4,059,883 | 11/1977 | Osbourne | 29/263 |

FOREIGN PATENT DOCUMENTS

| | | | |
|---|---|---|---|
| 237589 | 2/1962 | Australia | 29/264 |
| 1269069 | 8/1962 | Fed. Rep. of Germany | 29/261 |
| 848567 | 11/1939 | France | 29/261 |

*Primary Examiner*—James L. Jones, Jr.
*Attorney, Agent, or Firm*—Robert B. Kennedy

[57] ABSTRACT

A cylinder lock removal tool comprises a generally cup-shaped casing having an annular side wall and an end wall with the annular side wall defining a generally cylindrical bore. A cylindrical collet sized to be received within the casing bore has a set of radially spaced resilient fingers extending from a collet base. A sleeve has an interior cylindrical surface sized to be slid over and in sliding engagement with the collet fingers and base, and an exterior cylindrical surface sized to be received within the casing annular wall. The tool also includes a threaded bolt for drawing the collet and sleeve into the casing bore.

A method of removing a cylindrical lock from a lock mount comprises the steps of placing an annular array of resilient collet fingers in gripping engagement about the cylindrical lock; sliding a rigid sleeve over the annular array of resilient collet fingers into snug engagement therewith; and drawing the collet and sleeve into an open ended casing positioned against the lock mount about the lock.

2 Claims, 2 Drawing Figures

TOOL FOR REMOVING A CYLINDER LOCK

BACKGROUND OF THE INVENTION

This invention relates generally to methods and means for removing cylinder locks from their mounts.

Today, cylinder locks are in wide spread use, particularly in the automotive industry. Cylinder locks are mounted on the steering column of automobiles, and also in the car doors and trunk. It frequently occurs that the automobile owner or possessor needs to operate one of these locks but finds himself without the key. Being away from his shop in such situations it is usually easier for a locksmith to remove the entire cylinder lock from its mount rather than to fabricate a key for the particular lock in question.

Heretofore, tools have been devised, such as those shown in U.S. Pat. Nos. 3,972,103, 4,021,903, and 4,059,883 for accomplishing this. Typically, these cylinder lock removal tools include an annular array of resilient fingers which may be telescopically placed over that portion of the cylinder lock which protrudes slightly from its mounting, Terminal lips on the array of resilient fingers are snapped about the peripheral lip of the cylinder lock itself. The fingers are then drawn, as with the use of a threaded bolt, into a cup-shaped tool casing having its lip placed in abutment with the lock mount.

It frequently occurs, however, that in so drawing the lock from its mount that the resilient fingers become dislodged from the lock. This tends to occur all too frequently because of the resiliency of the fingers themselves that enables them initially to be snapped into place about the cylinder lock plus the axial resistance which the cylinder lock exerts against the small gripping surface of the finger lips during lock extraction. This axial resistance itself tends to apply a radial force upon the fingers causing them to spread and loose their grip.

Accordingly, it is a general object of the present invention to provide an improved cylinder lock removal tools.

Another general object of the invention is to provide an improved method for removing a cylinder lock from a lock mount.

Another object of the invention is to provide a cylinder lock removal tool having an annular array of resilient fingers adapted to be placed about a cylinder lock with means for inhibiting separation of the resilient fingers from their gripping engagement with the lock during removal of the lock from its mount.

Another object of the invention is to provide a cylinder lock removal tool of the type described with means for inhibiting rotation of the resilient fingers and lock during axial removal.

Another object of the invention is to provide a cylinder lock removal tool of the type described of relatively simple and economic construction.

Yet another object of the invention is to provide a method for removing a cylinder lock from its mount wherein the lock is tenaciously gripped during lock removal.

Still another object of the invention is to provide a method for removing a cylinder lock of the type described the use of which may be learned and practiced with a minimum of time and effort.

SUMMARY OF THE INVENTION

In one form of the invention a cylinder lock removal tool is provided having a cylindrical collet provided with a set of radially spaced resilient fingers, an open ended casing having a cavity sized to receive the cylindrical collet, and means for drawing the collet into the casing cavity. A cylindrical sleeve is sized to be received within the casing cavity about the collet radially spaced resilient fingers to permit radially outward spreading of the fingers in one position about the collet and to inhibit radially outward spreading of the fingers in another position about the collet from fingers in gripping engagement with a cylinder lock during lock removal.

In another form of the invention a cylinder lock removal tool is provided comprising a generally cup-shaped casing having an annular side and a end wall with the annular side wall defining an annular cylindrical bore. A cylinder collet is sized to be received within the casing bore with a set of radially spaced resilient fingers extending from a collet base. A sleeve is provided having an interior cylindrical surface sized to be slid over and in sliding engagement with the collet fingers and base, and an exterior surface sized to be received within the casing annular wall. The tool also includes means for drawing the collet and sleeve into the casing bore.

In yet another form of the invention a cylindrical lock removal tool is provided which comprises a generally cup-shaped casing having a cylindrical bore extending from open casing end to an end wall at the casing end opposite the open end. A cylindrical collet is sized to be passed through the casing open end and received within the casing bore with the end of the collet adjacent the casing end wall forming a collet base and with the end of the collet distal the casing end wall formed with an annular array of resilient fingers. A tubular sleeve is mounted within the casing bore in sliding engagement about the collet. So constructed, the collet may be positioned within the casing and sleeve with the array of resilient fingers protruding out of the casing open end and out of the sleeve for mounting about a cylindrical block. After being mounted to the lock the collet fingers may be repositioned within the casing bore with the array of collet fingers within the sleeve with the sleeve preventing radially outward movement of the fingers from their grip with the lock during lock removal.

Still another preferred form of the invention a method is provided for removing a cylinder lock from a lock mount. The method comprises the steps of placing an annular array of resilient collet fingers in gripping engagement about the cylinder lock, sliding a rigid sleeve over the array of resilient fingers into snug engagement therewith, and drawing the collet and sleeve into an open ended casing positioned against the lock mount about the lock.

DESCRIPTION OF THE PREFERRED EMBODIMENTS

Figure 1:
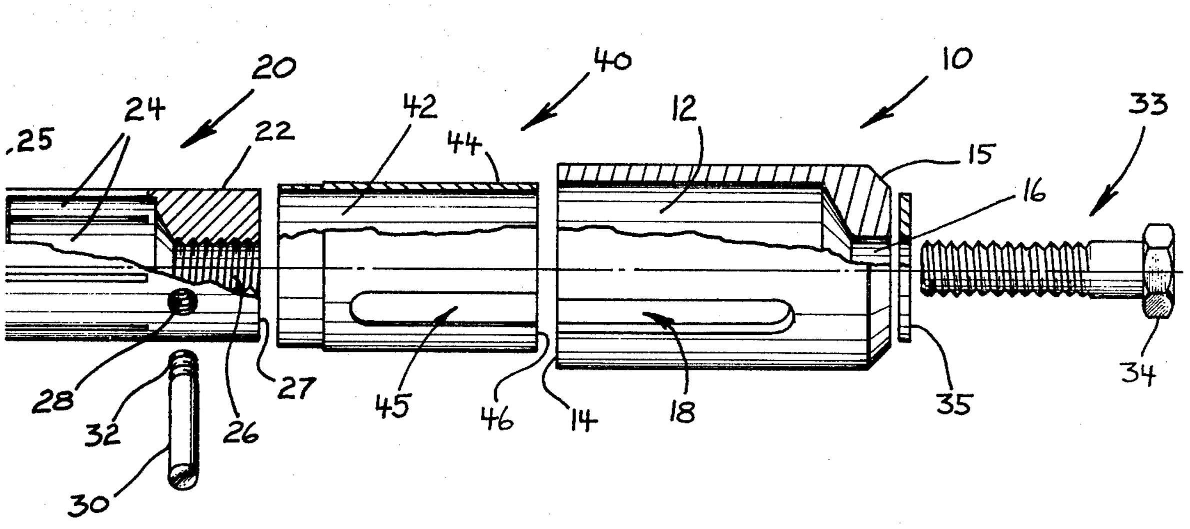
FIG. 1 is a side elevational, exploded view of a cylinder lock removal tool embodying principles of the invention with a portion of the components shown in cross-section to reveal interior constructural details.

Referring now in more detail to the drawing, there is shown a cylinder lock removal tool embodying principles of the invention in a preferred form which tool may be used in practicing the previously described method of the invention. The tool is seen to include a generally cup-shaped casing 10 having a cylindrical interior wall 12 which communicates with an open end 14. The cylindrical wall unitarily merges with an end wall 15 having a passageway 16 therethrough which communicates with the casing bore defined by the cylindrical wall 12. Wall 12 also defines an elongated slot 18 that extends to the open end 14 of the casing.

The tool also includes a generally cylindrical shaped collet 20 having a base portion 22 from which a set of resilient fingers 24 extend. The ends of the resilient fingers are provided with inturned lips 25. The collet base 22 is provided with a threaded channel 26 that extends from the end 27 of the collet distal the resilient fingers. A threaded passageway 28 is also provided in a side of the base to receive a set screw 30 having threads 32 on the end thereof sized to be threadedly inserted into the passageway 28. The tool also includes a threaded bolt 33 having a head 34. A washer 35 is also provided to receive the bolt shank therethrough.

The cylinder lock removal tool is further seen to include a tubular sleeve 40 of cylindrical construction. The interior wall 42 of the sleeve is of the size to receive the collet 20 therewithin in sliding abutment to create a snug fit once the sleeve is telescoped about the collet. The exterior surface 44 of the collet is of the size to be received within the bounds of the casing wall 12 with a very slight gap therebetween. The sleeve 40 is also provided with an elongated slot 45 that communicates with an end 46 of the sleeve adapted to be positioned adjacent the casing base 15 when disposed therewithin the casing.

Figure 2:
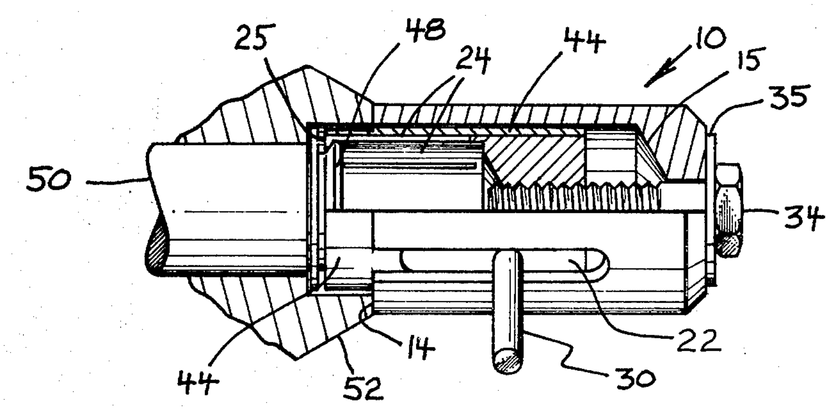
FIG. 2 is a side elevational view, partly in cross-section, of the cylinder lock removal tool illustrated in FIG. 1 shown assembled and in gripping engagement with a cylinder lock during a lock removal operation.

In operation the just described components are assembled as shown in FIG. 2 with the threads of bolt 33 threadedly received within the collet base and with the set screw 30 extending through slots 18 and 45 of the casing and sleeve respectively and into the threaded channel 28 of the collet base. An end portion of the array of resilient fingers is then pulled to a protruding position outside the bounds of the casing open end 14 and the tubular sleeve slid within the casing uncovering the protruding end position of the finger array. The finger lips 25 are then snapped over a lip 48 of a cylinder lock 50. This is easily accomplished due to the resiliency of the fingers and to the fact that their radial displacement is uninhibited by either the tool casing or sleeve. The tubular sleeve is then slid to a position over the entire surface of the resilient fingers.

Next the annular open end 14 of the casing is placed against the lock mount 52 as shown in FIG. 2 and the bolt head 34 rotated causing the collet to be pulled into the casing. During this rotation set screw 30 prevents annular rotation of the collet. Also during the extraction of the lock from its mount and into the casing the tubular sleeve inhibits radial movement displacement of the fingers which could bring finger lips 25 out of their gripping engagement with the annular lip 48 of the lock. In this manner the cylinder lock is removed from its mount with assurance that the collet is not moved from its gripping engagement with the lock itself.

It should be understood that the just described embodiments merely illustrate the principles of the invention in selected, preferred forms. Many modifications, additions, and deletions may, of course, be made thereto without departure from the spirit and scope of the invention as set forth in the following claims.

I claim:

1. A cylinder lock removal tool comprising, in combination, a generally cup-shaped casing having an annular side wall defining a generally cylindrical bore and an end wall defining an opening; a generally cylindrical collet sized to be received within said casing cylindrical bore and having a collet base provided with female screw threads from which base a cylindrical array of radially spaced resilient fingers extend; a sleeve having an interior cylindrical surface sized to be slid axially over in axially sliding engagement with said collet resilient fingers and base, and an exterior cylindrical surface sized to be received within said casing annular wall; a bolt having a threaded shank sized to be passed through said casing opening and threadedly received within said collet female screw threads; and means for preventing relative rotational movement between said collet and casing; whereby the collet resilient fingers may be snapped about a cylinder lock, the sleeve slid axially over the collet, the casing placed against the cylinder lock mount about the sleeve and collet, and the lock removed from the mount by rotation of the bolt shank threadedly received in the collet female screw threads with the sleeve preventing separation of the collet fingers from the lock.

2. A cylinder lock in accordance with claim 1 wherein said casing annular side wall defines a slot extending from an end of said casing distal said casing end wall; said sleeve defines a slot extending from one end thereof; said collet base defines a radially oriented threaded channel; and wherein said tool further comprises a set screw sized to be passed through said casing side wall slot and said sleeve slot and threaded into said collet base threaded channel.

* * * * *